Oct. 31, 1939.  V. BRUNETTI  2,178,015
APPARATUS FOR MAKING PIPE
Filed Dec. 8, 1937  4 Sheets-Sheet 1
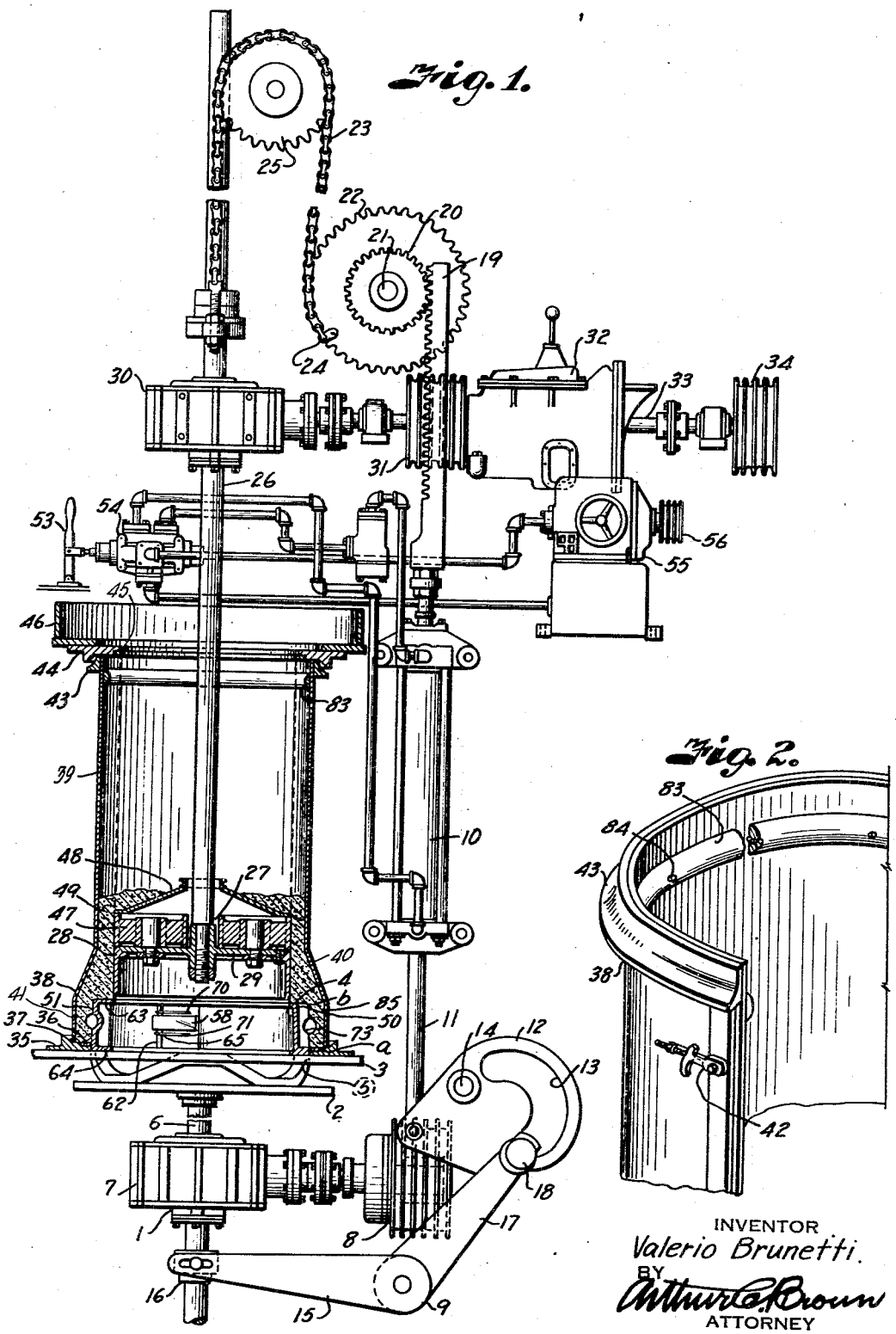
INVENTOR
Valerio Brunetti.
BY
Arthur C. Brown
ATTORNEY

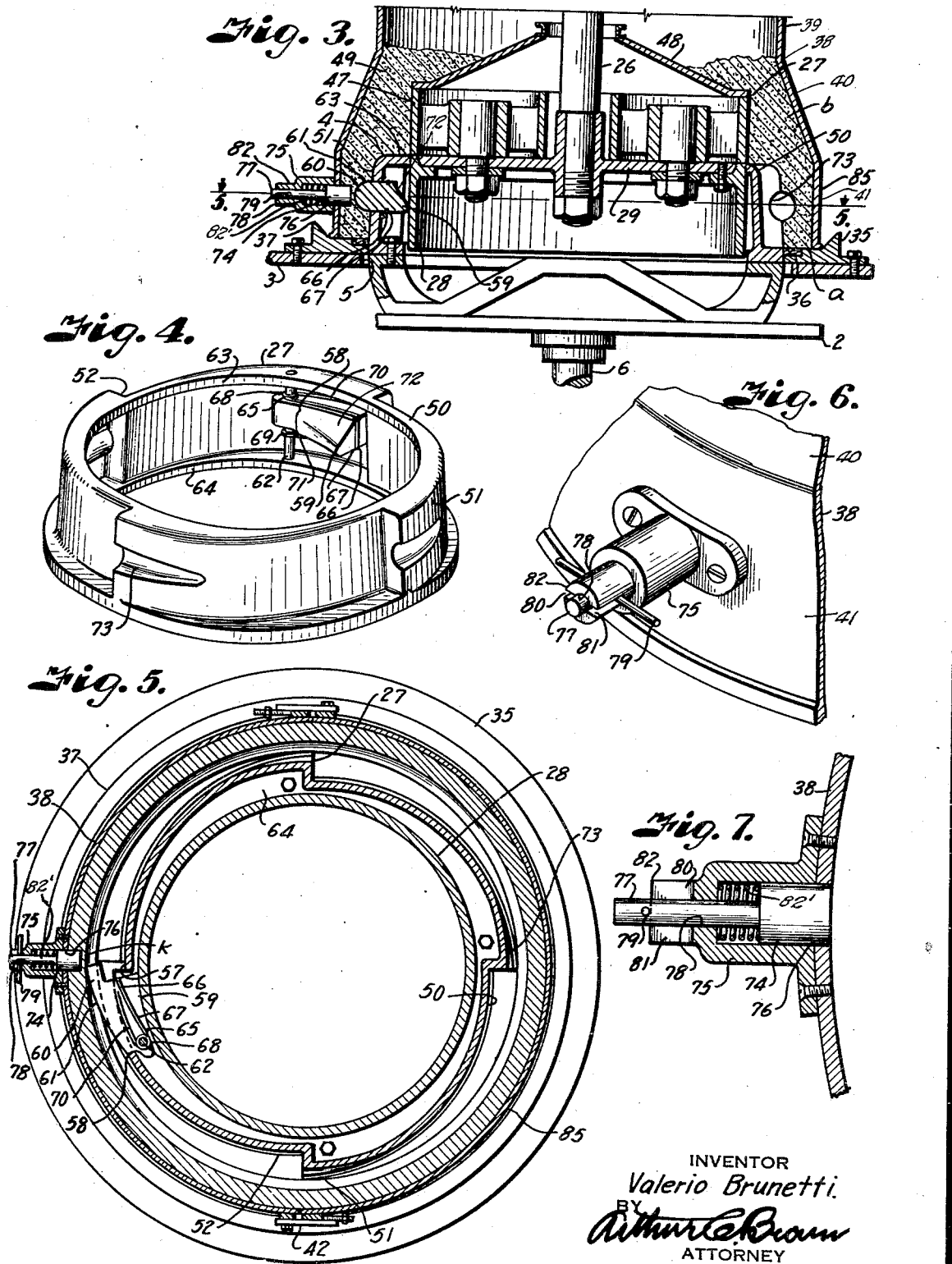

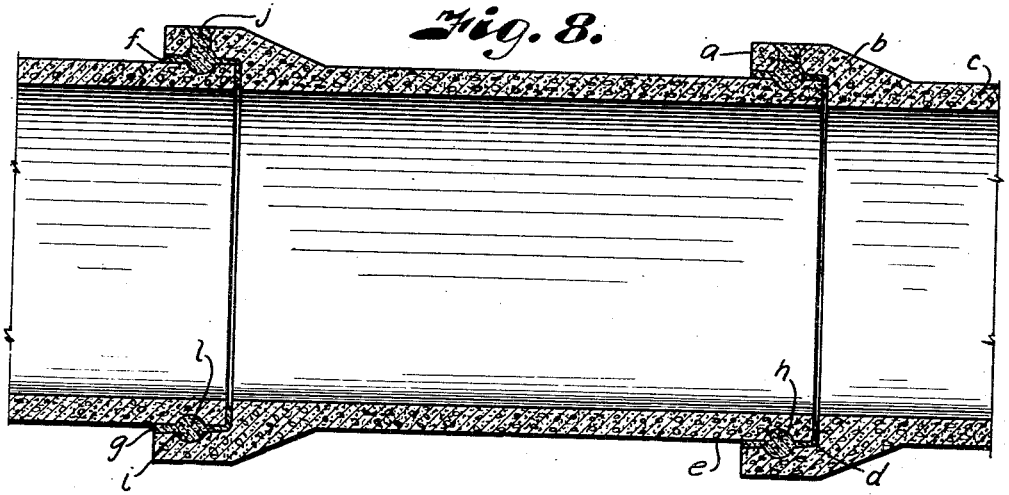
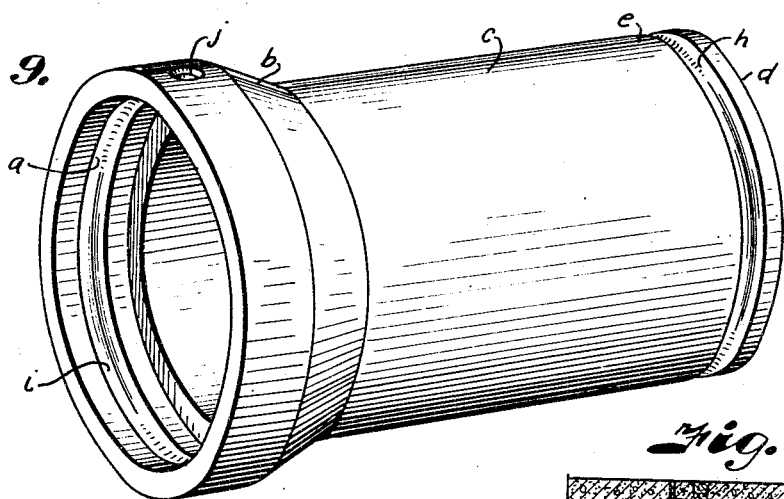
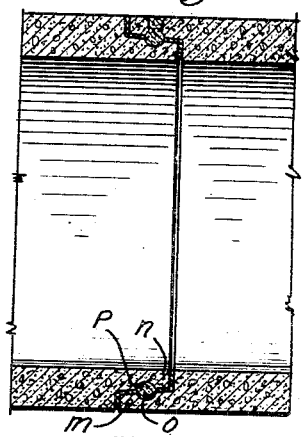
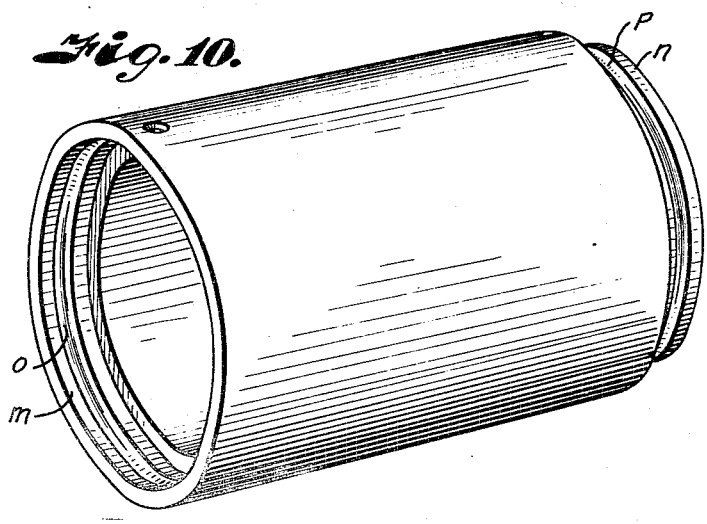

Oct. 31, 1939.　　　　V. BRUNETTI　　　2,178,015
APPARATUS FOR MAKING PIPE
Filed Dec. 8, 1937　　　　4 Sheets-Sheet 4
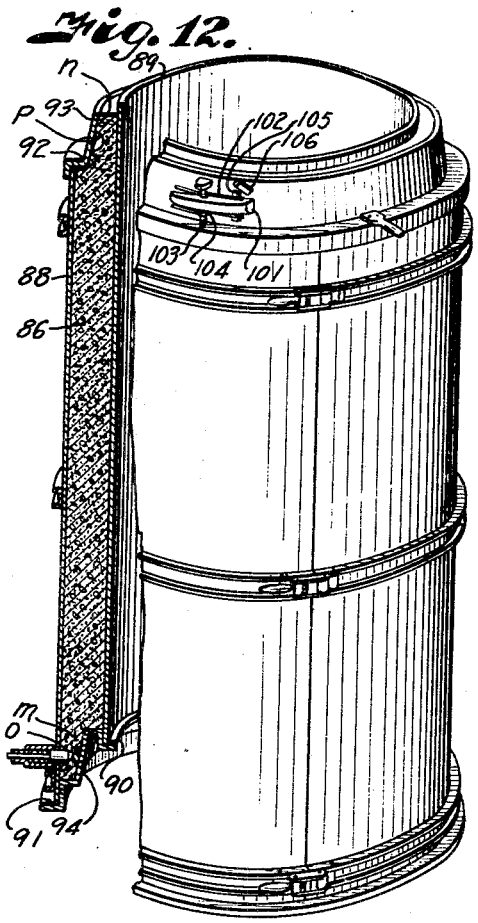
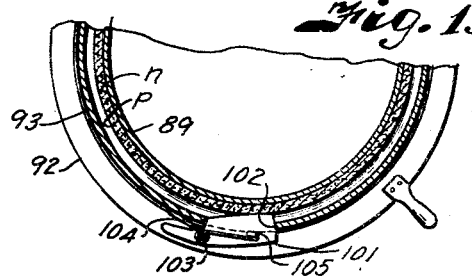
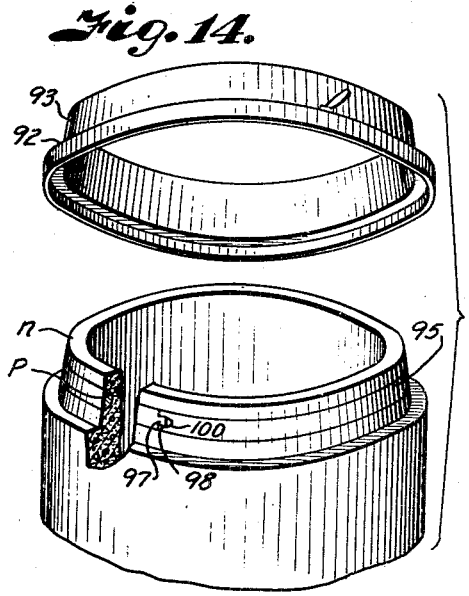
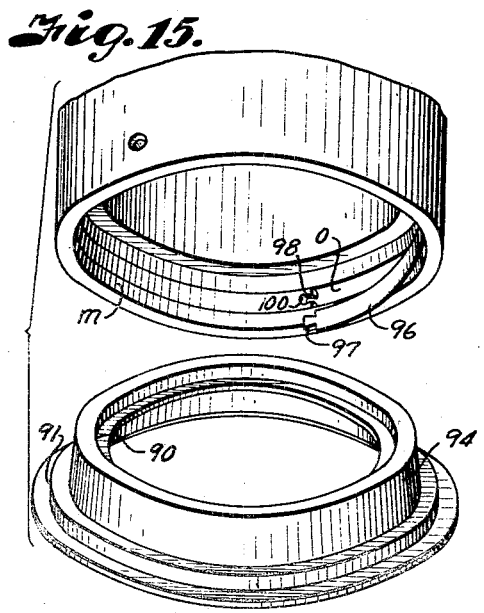
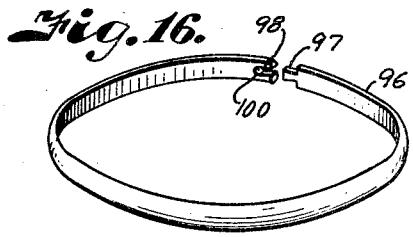
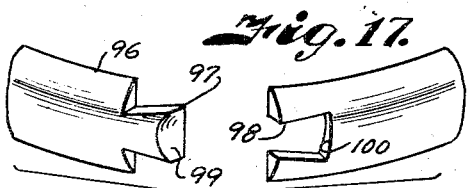
INVENTOR
Valerio Burnetti
BY
ATTORNEY Patented Oct. 31, 1939

2,178,015

UNITED STATES PATENT OFFICE 2,178,015

APPARATUS FOR MAKING PIPE

Valerio Brunetti, Pittsburg, Kans.

Application December 8, 1937, Serial No. 178,734

5 Claims. (Cl. 25—36)

This invention relates to an apparatus for making pipe from concrete and similar materials and particularly pipe sections having interfitting ends that are sealed together with cementitious materials when the sections are installed in a pipe line.

The principal object of the invention is to provide a simple and inexpensive apparatus for producing pipe sections having grooves for containing the cementitious material.

Other important objects of the invention are to provide a pipe forming apparatus of the packer head type with groove forming means operable simultaneously with the packer head; to provide a machine of this type with means for forming a fill opening in registry with the groove in the bell end of the pipe section; and to provide a groove forming means that does not interfere with removal of the form from the pipe or withdrawal of the bell packer.

In accomplishing these and other objects of the invention, as hereinafter pointed out, I have provided improved details of structure, the preferred forms of which are illustrated in the accompanying drawings, wherein:

Fig. 1 is a side elevation of a pipe forming machine of the packer head type, equipped to form sealing grooves in accordance with the present invention, the pipe form, roller packer, and the upper and lower pallets being shown in vertical section.

Fig. 2 is a fragmentary perspective view of the upper or spigot end of the pipe form showing the ring for forming the spigot groove.

Fig. 3 is an enlarged vertical section through the lower end of the form, roller head, and bell packer, particularly illustrating the formation of the groove within the bell.

Fig. 4 is a detail perspective view of the bell packer equipped with groove forming means as in accordance with the present invention.

Fig. 5 is a horizontal section on the line 5—5 of Fig. 3.

Fig. 6 is a detail perspective view of the bell end of the pipe form showing the plunger for forming the groove fill opening.

Fig. 7 is a horizontal section through the plunger support showing the plunger retracted to permit removal of the form.

Fig. 8 is a longitudinal section through a portion of a pipe line constructed of pipe that is produced in accordance with the present invention.

Fig. 9 is a perspective view of one of the completed pipe sections, particularly illustrating the grooves formed in the bell and spigot ends thereof.

Fig. 10 is a perspective view of a pipe section of the tongue groove type as produced in accordance with the present invention.

Fig. 11 is a fragmentary section through the joint of a pipe line constructed of sections illustrated in Fig. 10.

Refering more in detail to the drawings:—

1 designates a pipe forming machine of the packer head type and which includes a turntable 2 that is rotatably supported below a floor or platform 3 and carries a bell packer 4 that is adapted to operate within an opening 5 of the platform 3. The turntable 2 is carried upon a drive shaft 6 that is reciprocably and rotatably mounted within a gear box 7 having suitable gearing operatively connected with a driving pulley 8 to effect rotation of the turntable. The shaft 6 is reciprocated by a bell crank lever 9 to raise and lower the bell packer through the opening in the platform incidental to the operation of a hydraulic ram indicated by the cylinder 10.

Slidable in the cylinder 10 is a piston actuated rod 11, having connection with the bell crank 9 through a plate-like lever 12, having an arcuate slot 13 aranged therein eccentric with a fixed fulcrum pin 14 on which the plate is adapted to be oscillated. The bell crank lever 9 has an arm 15 connected with the shaft 6 through a pin and collar connection 16 and an arm 17 carrying a pin 18 operating in the slot 13. The opposite end of the rod 11 projects through the upper end of the cylinder 10 and carries a toothed rack 19 which meshes with a gear 20 rotatably mounted on a fixed spindle 21. Also mounted on the spindle 21, in fixed driving relation with the gear 20, is a sprocket 22, to the periphery of which is connected a chain 23, as indicated at 24. The chain 23 is arranged to be wrapped about the sprocket 22 incidental to actuation of the ram and operates over a sprocket 25 for raising and lowering an actuating shaft 26 which carries a packer head 27.

The packer head 27 includes a cylindrical skirt 28 that is shaped and dimensioned according to the inner contour of a pipe section to be produced by the machine, and has a diaphragm 29 connected with the actuating shaft 26. The shaft 26 is slidably and rotatably mounted within a gear housing 30, similar to the housing 7, previously mentioned. The gear housing 30 contains a suitable gearing (not shown), that is driven by a pulley 31 from a multiple speed gear reducing mechanism 32, the gear mechanism 32 being actuated by any suitable prime mover operably connected with the power shaft 33 of the transmission through a belt connection, as indicated by the pulley 34. The shaft 26 is thus adapted to be raised and lowered and simultaneously rotated to effect reciprocation of the head 27.

Supported on the platform 3, circumferentially of the opening 5 therein, is a bottom pallet 35, having a wearing or packing ring 36 for forming the face $a$ of the bell end $b$ of a pipe section $c$. Seated upon the pallet and retained by an annular flange 37, in spaced concentric relation with the bell packer, is a form or jacket 38 for moulding the outer contour of the pipe section $c$. In the illustrated instance the jacket 38 includes a cylindrical body 39, having an outwardly and downwardly flaring lower portion 40 terminating in a downwardly extending cylindrical portion 41 to form the outer surface of the bell end $b$ of the pipe section $c$. In order to permit removal of the pipe section $c$, the form 38 is preferably split longitudinally thereof and the sections secured together by means of suitable clamps as indicated at 42 in Fig. 2. The upper end of the form carries a reinforcing ring 43 for seating the top pallet 44 that forms the face $d$ on the spigot end $e$ of the pipe and the pallet 44 is provided with a central opening 45, conforming to the diameter of the packer head. Carried upon the pallet 44 is a hopper 46 through which the pipe forming material, such as concrete, is poured within the upper open end of the form.

The roller packer head carries a plurality of packing rollers 47 that are adapted to rollingly compact and smooth out the concrete and form the inner surface of the pipe section. The rollers are preferably covered by means of a cone-shaped deflector plate 48 for directing the pipe forming material into the space 49 about the periphery of the head.

The bell packer 4, previously mentioned, includes a cylindrical ring 50, having a plurality of eccentrically arranged, arcuate, paddle-like packing faces 51 arranged to compact the material forming the bell $b$ to a slightly larger diameter than that of the body section of the form so that the inner face of the bell end $b$ of one pipe section will cooperate with the outer surface of the spigot end $e$ of an adjacent pipe section to leave an annular space $f$ therebetween, as shown in Fig. 8, for a sealing material $g$ when the pipe sections are installed in a pipe line, as later described.

Intermediate the packing faces 51 are recesses 52 into which the pipe forming material is delivered from off the periphery of the packer head to be compressed against the belled end of the form, as later described.

The ram 10 is actuated under control of the operator through a hand lever 53 that is operably connected with a control valve 54 for selectively diverting a pressure fluid to and from the respective ends of the ram to actuate the piston in the desired direction, pressure being maintained on the fluid by a pump 55 that is provided with a pulley 56 adapted to be connected with a suitable prime mover (not shown).

The machine as thus far described is conventional of present packer head machines and specifically forms no part of the present invention which has to do with formation of sealing material containing grooves $h$ extending circumferentially of the spigot end $e$ of the pipe section and cooperative grooves $i$ in the bell end $b$ (Fig. 9), as now to be described.

Formed in one of the packing faces 51 of the bell packer ring 50 is a substantially rectangular-shaped opening 57 in which is pivotally mounted a groove forming dog or wiper 58. The dog 58 includes a substantially wedge-shaped body 59, having a projecting finger 60 shaped to conform with the desired groove $i$ to be produced within the bell end of the pipe. In the illustrated instance the wiping face 61 of the finger 60 is of substantially semicircular cross-section to form a groove $i$ of substantially semicircular cross-section. The dog 58 is pivotally carried upon a pin 62, having its ends supported in upper and lower internal flanges 63 and 64 of the ring 50. The dog is yieldingly retained in retractive position by means of a wire 65 bent to form a loop portion 66 that engages within a groove 67 formed within the end of the dog. The sides of the loop extend over the upper and lower faces of the dog and terminate in coils 68 and 69 that encircle the pin 62. The free ends 70 and 71 engage against the inner face of the ring to hold the dog in retracted position with the rounded face thereof within the packing face 51. The dog has an inclined cam portion 72 on its inner edge which is adapted to be engaged by the packer head to urge the finger of the dog into position for forming the sealing groove within the bell face of the pipe at the time the packer head is lowered into the bell packer, as later described. In order to prevent the packing faces from distorting the shape of the groove imparted by the dog, they are preferably provided with recesses 73 which bridge the groove. The packing faces, therefore, are effective only at points above and below the groove. The dog, however, is effective in packing this portion of the bell.

To provide a fill opening $j$ for inserting the jointing material $g$ within the groove, the form 38 carries a plunger 74 that is slidably mounted within a tubular guide 75 which is secured concentrically of an opening 76 in the bell end of the form and located in horizontal alignment with the groove forming dog. The plunger 74 has a reduced stem 77 that is slidably retained in a reduced bore 78 of the plunger guide and carries a T-shaped handle 79 that engages within diametrically arranged slots 80 and 81 that are formed in a reduced tubular extension 82 of the guide, as best shown in Fig. 6. Sleeved over the stem and having one end bearing against the plunger and the other against the bottom of the guide is a coil spring 82' for normally projecting the plunger within the form so that when the pipe forming material is packed thereabout a socket $j$ is formed within the bell $b$ of the pipe section. The bottoms of the slots 80 and 81 are preferably arranged to form stops whereby the end face of the plunger is kept from engagement with the groove forming dog so that a thin diaphragm $k$ is formed in the pipe in alignment with the groove $i$ which may be punched out when the pipe is to be used.

When the form is to be removed from a formed pipe, the handle 79 is engaged and withdrawn from the slots 80 and 81, whereupon the handle is turned substantially 90° to engage the end of the guide extension 82, as best illustrated in Fig. 7. In this position the end of the plunger is completely withdrawn from engagement with the formed pipe, as shown in Fig. 7.

In order to form the groove $h$, in the spigot end $e$ of the pipe, the form is provided with an annular ring or insert 83, which is of substantially semicircular cross-section and is secured to the inner face of the form by fasteing devices, such as screws 84. The insert 83 is located relatively to the groove forming dog so that when the sections are used in a pipe line the groove h formed thereby on one section will register with the groove i on the bell end of an adjacent section to produce a substantially cylindrical annular passageway l in which the cementitious sealing material g is inserted through the opening j produced in the bell end of the pipe, as best shown in Fig. 8.

In operating a machine constructed as described, the platform 2 is normally in position so that the top of the bell packer 4 is in substantial registry with the upper plane of the wearing ring 36 and the packer head 27 is in its uppermost position. A form 38 is then assembled with the bell end thereof seated upon the bottom pallet 35. The top pallet 44 and hopper 46 are then applied on the upper end of the form. The packer head 27 is then lowered into the form by adjusting the valve 54 so that pressure fluid is admitted to the upper end of the ram cylinder 10 to move the piston downwardly therein so that the rack 19 rotates the gear 20 in a clockwise direction (Fig. 1), to unwind the chain 23 from wrapped relation with the sprocket 22. During this movement the lever 12 is rocked on its pivot 14, however, the slot 13 therein allows the turntable 2 to remain retracted throughout the major movement of the packer head 27. The end of the slot 13, however, will engage the bell crank lever 17 to move the bell packer 4 into position for cooperating with the form in shaping the bell end b of a pipe section. When the ram comes to rest the packer head 27 will have entered the bell packer ring 50 so that the periphery thereof will engage the inclined surface 59 of the dog 58 to move it outwardly against action of the spring 62 so that the groove forming face 61 thereof projects beyond the packing face in which the dog is mounted. A relatively dry concrete or other material from which the pipe is to be formed is poured into the hopper 46 and into the form so that it is deflected by the cone-shaped baffle 48 and guided into the space about the packer head. The transmission 32 is set into operation at the desired speed to cause rotation of the shafts 6 and 26, thereby rotating the bell packer 4 and packer head 27. Rotation of the packer head causes the rollers 47 to pack the concrete against the form under sufficient pressure to form a dense, compact mass of the material and to press it into the space surrounding the bell packer 4. Rotation of the bell packer 4 will cause the faces 51 thereon to compress the concrete against the cylindrical portion 85 of the form. The projected end 62 of the dog will wipe a groove i into the face of the concrete, as shown in Fig. 5. The recesses or relieved surfaces 73 of the succeeding packing faces prevent crushing of the concrete into the form groove i so that the groove retains the clean shape imparted to it by the rounded surface of the dog. The operator reverses the handle 53 so as to effect transfer of the pressure fluid from the top to the bottom of the ram, thereby starting upward movement of the packer head and effecting formation of the body portion of the pipe section. In this operation the rod 11 reverses travel of the rack and rotates the gear 20 in a counter-clockwise direction, winding up the chain 23 on the sprocket 22 and lifting the shaft 26 simultaneously with rotation thereof through the gear mechanism as indicated by the housing 30. Movement of the rod 11 also rocks the cam plate 12 in the opposite direction but the bell packer 4 will remain in position until the end of the arcuate slot 13 of the plate 12 engages the pin of the bell crank lever 17, whereupon the table 2 is lowered to effect withdrawal of the bell packer 4. As soon as the packer head 27 has disengaged from the dog 58 the spring 62 will effect retraction of the dog and hold it in that position. The bell packer is, therefore, withdrawn without injuring the shape of the groove. When the packer head 27 has reached the upper end of the form the concrete is packed in and around the insert ring 83 which forms the groove h in the spigot end e of the pipe section. When the pipe section is completed and the packing head completely withdrawn, the top pallet 44 and hopper 46 are removed, and the form carrying the pipe section is removed from the lower pallet 35, whereupon another form is applied and the process repeated to produce another pipe. After removal from the machine, the form is stripped from the pipe section and the concrete is cured as in customary practice.

When the pipe sections constructed as described are to be used in a pipe line they are placed with the spigot end e of one pipe within the bell b of an adjoining pipe. In this position the grooves h and i register so that a cement or other sealing material g may be run into the annular spaces f and l of the joint through the inlet opening j, as clearly shown in Fig. 8.

From the foregoing it is obvious that I have provided an improved apparatus for forming pipe sections wherein the sections are provided with grooves for the sealing material with which the pipe sections are adapted to be locked in sealing engagement when they are used in a pipe line as illustrated in Figs. 8 and 11.

What I claim and desire to secure by Letters Patent is:

1. In an apparatus for making pipe having bell and spigot ends, a form corresponding in shape to the outer contour of the pipe to be formed, means for charging the form with a plastic mixture, a bell packer rotatably supported within the bell end of the form, a rotary packer cooperating with the bell packer for packing the mixture to form the pipe, means on the bell packer for forming an annular groove within the bell of the pipe, and a plunger carried by the form for producing an opening in the bell of the pipe in alignment with said groove.

2. In an apparatus for making pipe having bell and spigot ends, a form corresponding to the outer contour of the pipe, a bell packer rotatably mounted in the bell end of the form and having a plurality of compacting faces, a packer head rotatably and reciprocably mounted in the form, a groove forming member carried by the bell packer and having a cam portion engageable by the packer head for effecting projection of the groove forming member beyond the compacting faces, and a spring for retracting said groove forming member.

3. In an apparatus for making pipe having bell and spigot ends including a form, a bell packer rotatably supported within the bell end of the form, a groove forming member carried by the bell packer and normally retracted within the periphery of said bell packer, a packer reciprocable in the form to and from the bell packer and having a portion engageable with said groove forming member to effect projection thereof beyond said periphery in one position of the reciprocable packer to produce a groove in the bell end of a pipe under formation, and means for retracting said groove forming member when the reciprocable packer moves away from the bell packer.

4. An apparatus for making pipe having bell and spigot ends including a form, a bell packer rotatably supported within the bell end of the form, a groove forming member carried by the bell packer and normally retracted within the periphery of said packer, said groove forming member having a cam portion, a packer reciprocable in the form to and from the bell packer, and having a portion engageable with the cam portion of said groove forming member to effect projection thereof beyond said rotational plane to form a groove in the bell end of a pipe produced in said form, and means for retracting said groove forming member when the reciprocable packer moves away from said cam portion.

5. In an apparatus for making pipe of the character described, a form, a bell packer rotatably mounted at one end of the form including a rotary head having a compacting face, a packer reciprocable in the form to and from the bell packer, a groove forming member having a wiping portion retracted within the circular path of said compacting face at one position of the reciprocable packer and adapted for projection beyond said circular path at another position of the reciprocable packer to produce a groove in a pipe under formation, cooperative means on the groove forming member and on said reciprocable packer to move said groove forming member into one of its positions, and means for moving the groove forming member into its other position.

VALERIO BRUNETTI.